United States Patent
Michal

(10) Patent No.: US 9,917,506 B2
(45) Date of Patent: Mar. 13, 2018

(54) BOOST CONVERTER MAXIMAL OUTPUT POWER DETECTOR ALLOWING OPTIMAL DYNAMIC DUTY-CYCLE LIMITATION

(71) Applicant: STMicroelectronics (Alps) SAS, Grenoble (FR)

(72) Inventor: Vratislav Michal, Grenoble (FR)

(73) Assignee: STMICROELECTRONICS (ALPS) SAS, Grenoble (FR)

( * ) Notice: Subject to any disclaimer, the term of this patent is extended or adjusted under 35 U.S.C. 154(b) by 118 days.

(21) Appl. No.: 14/975,138

(22) Filed: Dec. 18, 2015

(65) Prior Publication Data

US 2017/0179816 A1     Jun. 22, 2017

(51) Int. Cl.
H02M 3/04 (2006.01)
H02M 3/156 (2006.01)
H02M 3/158 (2006.01)
H02M 1/00 (2006.01)

(52) U.S. Cl.
CPC ............ H02M 3/04 (2013.01); H02M 3/156 (2013.01); H02M 3/1588 (2013.01); H02M 2001/0054 (2013.01); Y02B 70/1466 (2013.01); Y02B 70/1491 (2013.01)

(58) Field of Classification Search
CPC ............ H02M 3/00; H02M 3/02; H02M 3/04; H02M 3/10; H02M 3/145; H02M 3/155; H02M 3/156; H02M 3/1563; H02M 3/157; H02M 3/158; H02M 3/1582; H02M 3/1588; H02M 2001/0009; H02M 2001/0016; H02M 2001/0019; H02M 2001/0022; H02M 2001/0025; H02M 2003/1552; H02M 2003/1555; H02M 2003/1566; H02M 2001/0054; G01R 19/00; G01R 19/165; G01R 19/16533; G01R 19/16538; G01R 19/16552; Y02B 70/1466; Y02B 70/1491
USPC ........ 323/205–211, 222–226, 234, 271–280, 323/282–286, 299, 351; 363/41, 47, 74, 363/79, 123–127
See application file for complete search history.

(56) References Cited

U.S. PATENT DOCUMENTS

2012/0223692 A1* 9/2012 Prodic ................. H02M 3/1584
                                                                323/283
2016/0359414 A1* 12/2016 Ozanoglu ........... H02M 3/1582

OTHER PUBLICATIONS

V. Michal, "Absolute value, 1% linear and lossless current-sensing circuit for the step-down dc-dc converters with integrated power stage", IEEE, May 2014, pp. 1256-1270.*

* cited by examiner

Primary Examiner — Timothy J Dole
Assistant Examiner — Carlos Rivera-Perez
(74) Attorney, Agent, or Firm — Seed IP Law Group LLP

(57) ABSTRACT

A method and apparatus for detecting a critical duty cycle that maximizes an output power of a boost converter is provided. In the method and apparatus, the boost converter may be operated at or below the critical duty cycle. In the method and apparatus, a first voltage that is a function of an output voltage of a boost converter and voltage drops across a first set of parasitic resistances of the boost converter is detected. A second voltage that is a function voltage drops across a second set of parasitic resistances of the boost converter is also detected. The voltages are compared to determine the critical duty cycle and the boost converter is operated in accordance with a duty cycle that does not exceed the critical duty cycle.

21 Claims, 10 Drawing Sheets

BOOST CONVERTER MAXIMAL OUTPUT POWER DETECTOR ALLOWING OPTIMAL DYNAMIC DUTY-CYCLE LIMITATION

BACKGROUND

Technical Field

This application is directed to detection of an output power-maximizing duty cycle of a boost converter and in particular to a boost converter having a feedback stage that generates the duty cycle and operates the boost converter in accordance with the duty cycle.

Description of the Related Art

Boost converters are conventionally operated at a variable duty cycle with a fixed maximal value. Limiting the boost converter to the maximal duty cycle protects the boost converter against excessive inductor current, but does not maximize the output power provided by the boost converter. For example, as the input available (maximal) power provided by a voltage source, such as a battery, decreases over time and with use, the output power of the boost converter is intended to be constant by a feedback regulation loop. However, with the duty cycle limited to a maximal value, $D_{MAX}$, the boost converter does not reach desired output voltage, and thus the output power. Furthermore, operating the boost converter without a fixed (or with a high value) duty cycle limit introduces a risk of destabilizing the boost converter. By exceeding some critical duty cycle value, $D_{CRIT}$, the boost converter is destabilized and comes to fall in a negative gain region of the boost converter input-output conversion characteristic.

BRIEF SUMMARY

Boost converters are a class of direct current (DC) to DC (DC-to-DC) converters that provide (to a load) an output voltage that is greater than an input voltage provided to the boost converter (for example, by a power source, such as a battery). A boost converter can be operated in accordance with a duty cycle that dictates the timing of switches of the boost converter. The duty cycle, which ranges from zero to one, dictates the output voltage of the boost converter.

For an operating boost converter, there is a critical duty cycle that maximizes the output power (and output voltage) of the boost converter. Operating the boost converter at a lower duty cycle does not yield the maximum possible output voltage. However, in many applications and circumstances, the desired output voltage is less than the maximum possible output voltage. Accordingly, in these circumstances, the boost converter may be operated at a duty cycle that is less than the critical duty cycle $D_{CRIT}$. If a higher output voltage is sought, the duty cycle is increased to provide the higher output voltage. However it will be important not to exceed the critical duty cycle. Operating the boost converter at a higher duty cycle than the critical duty cycle yields a lower voltage and may result in destabilizing the boost converter (as a result of negative gain).

Described herein is a feedback stage that detects the critical duty cycle of the boost converter, $D_{CRIT}$. During operation of the boost converter, as a higher output voltage is desired and the duty cycle increased, the feedback stage ensures that the boost converter is operated (capped) at or below the critical duty cycle, $D_{CRIT}$. Capping the duty cycle ensures that the maximal output voltage is outputted when so is sought. Further, capping the duty cycle avoids inverting the gain of the boost converter and destabilizing or damaging the boost converter by increasing the duty cycle beyond the critical duty cycle, $D_{CRIT}$.

DETAILED DESCRIPTION

Figure 1:
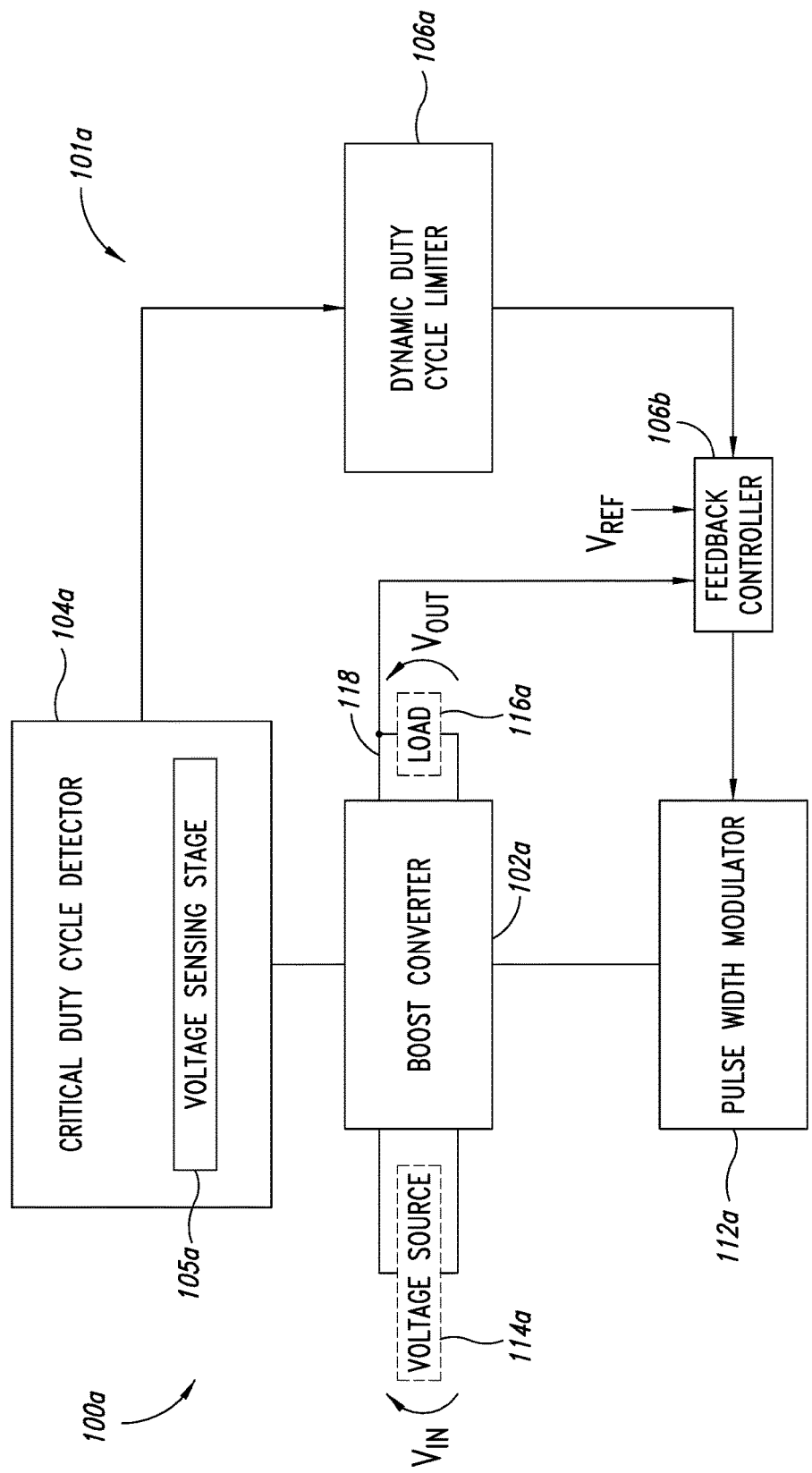
FIG. 1 shows a block diagram of a device comprising a boost converter and a duty-cycle limiting feedback stage.

FIG. 1 shows a block diagram of a device 100a comprising a boost converter 102a and a feedback stage 101a. The feedback stage 101a comprises a critical duty cycle detector 104a, a dynamic duty cycle limiter 106a, a feedback controller 106b and a pulse width modulator 112a. The critical duty cycle detector 104a comprises a voltage sensing stage 105a. The critical duty cycle detector 104a is coupled to the boost converter 102a and the dynamic duty cycle limiter 106a. In particular, the voltage sensing stage 105a of the critical duty cycle detector 104a is coupled, at its input, to the boost converter 102a and is coupled, at its output, to the dynamic duty cycle limiter 106a. The dynamic duty cycle limiter 106a is coupled, at its input, to the output of the critical duty cycle detector 104a. The dynamic duty cycle limiter 106a is coupled, at its output, to the feedback controller 106b. The feedback controller 106b is coupled at its inputs to the output of the dynamic duty cycle limiter 106a, an output terminal 118 of the boost converter 102a and a reference voltage. An output of the feedback controller 106b is coupled to an input of the pulse width modulator 112a. The pulse width modulator 112a is coupled at its output to the boost converter 102a.

The boost converter 102a is coupled to a voltage source 114a at an input of the boost converter 102a and a load 116a at an output of the boost converter 102a. The voltage source 114a, which may be a battery such as a Lithium-ion battery, supplies voltage (input voltage) to the boost converter 102a. The supplied voltage may be in accordance with a rated voltage of the voltage source 114a, which may, for example, be 3 Volts (V), among other rated voltages. The load 116a, on the other hand, draws a voltage (output voltage) from the boost converter 102a. The load 116a may be a consumer electronics headset, among many others, to which the boost converter supplied voltage. The load 116a is shown in FIG. 1 to draw the output voltage the output terminal 118 of the boost converter 102a.

The boost converter 102s supplies an output voltage to the load 116a that is higher than the input voltage supplied to the boost converter 102s by the voltage source 114a.

Operation of the boost converter 102a as described herein relies on the timing of the switching on (placing in the electrically conductive state) and off (placing in the electrically non-conductive state) of a pair of switches of the boost converter 102a. The pulse width modulator 112a controls switching on and off the switches of the boost converter 102a in accordance with a duty cycle as described herein. The duty cycle represent the percentage of time that one of the switches is on to the total time that the switch is either on or off.

The voltage sensing stage 105a of the critical duty cycle detector 104a senses a number of voltages of the boost converter 102a as described herein and outputs the sensed voltages to the dynamic duty cycle limiter 106a. The dynamic duty cycle limiter 106a receives the sensed voltages and compares the sensed voltages. A difference between the sensed voltages is indicative of a critical duty cycle at which the boost converter 102a may be operated. The critical duty cycle represents a duty cycle at which the boost converter 102a provides the highest output voltage given an output power of the voltage source 114a. The critical duty cycle also maintains stability and safe operation of the boost converter 102a. Maintaining a stable boost converter 102a includes avoiding an inversion of the gain of the boost converter 102a as well as avoiding negative feedback conditions.

The boost converter 102a need not necessarily to be operated at the critical duty cycle. The critical duty cycle is a limit or bound at which the boost converter 102a outputs the maximum voltage given input power. The boost converter 102a may be operated using a lower duty cycle if a smaller output voltage is desired.

The feedback controller 106b receives the indication of the critical duty cycle from the dynamic duty cycle limiter 106a. The feedback controller 106b also receives the output voltage of the boost converter 102a as output over the output terminal 118. The feedback controller 106b also receives a reference voltage, in order to provide feedback regulation of the desired output voltage. The reference voltage may have a voltage level that is sought to be output by the boost converter 102a. The feedback controller 106b compares the output voltage to the reference voltage. Based on the comparison, the feedback controller 106b determines whether the duty cycle at which the boost converter 102a operates should be increased or reduced. For example, if the output voltage is less than the reference voltage, the duty cycle may be increased and vice-versa. The feedback controller 106b ensures that the duty cycle is not increased beyond the critical duty cycle indicated by the output signal of the dynamic duty cycle limiter 106a.

The feedback controller 106b outputs an output signal to the pulse width modulator 112a indicating a change to the duty cycle of the boost converter 102a. The pulse width modulator 112a receives the output signal of the feedback controller 106b, accordingly, adjusts the duty cycle over which the boost converter 102a operates. The pulse width modulator 112a operates the switches of the boost converter 102a to achieve on/off timing in accordance with the duty cycle.

Although not shown in FIG. 1, the device 100a may also include a warning system. The warning system may receive the indication of the critical duty cycle from the dynamic duty cycle limiter 106a and determine whether an output power of voltage source 114a is below a threshold. If so, the warning system outputs a warning that the output power is below the threshold. Furthermore, the device 100a may also include a voltage source management system. The voltage source management system may protect the voltage source 114a from over discharging. For example, the voltage source management system may impose further limits on the critical duty cycle to limit the exposure of the voltage source to over-discharging.

Figure 2:
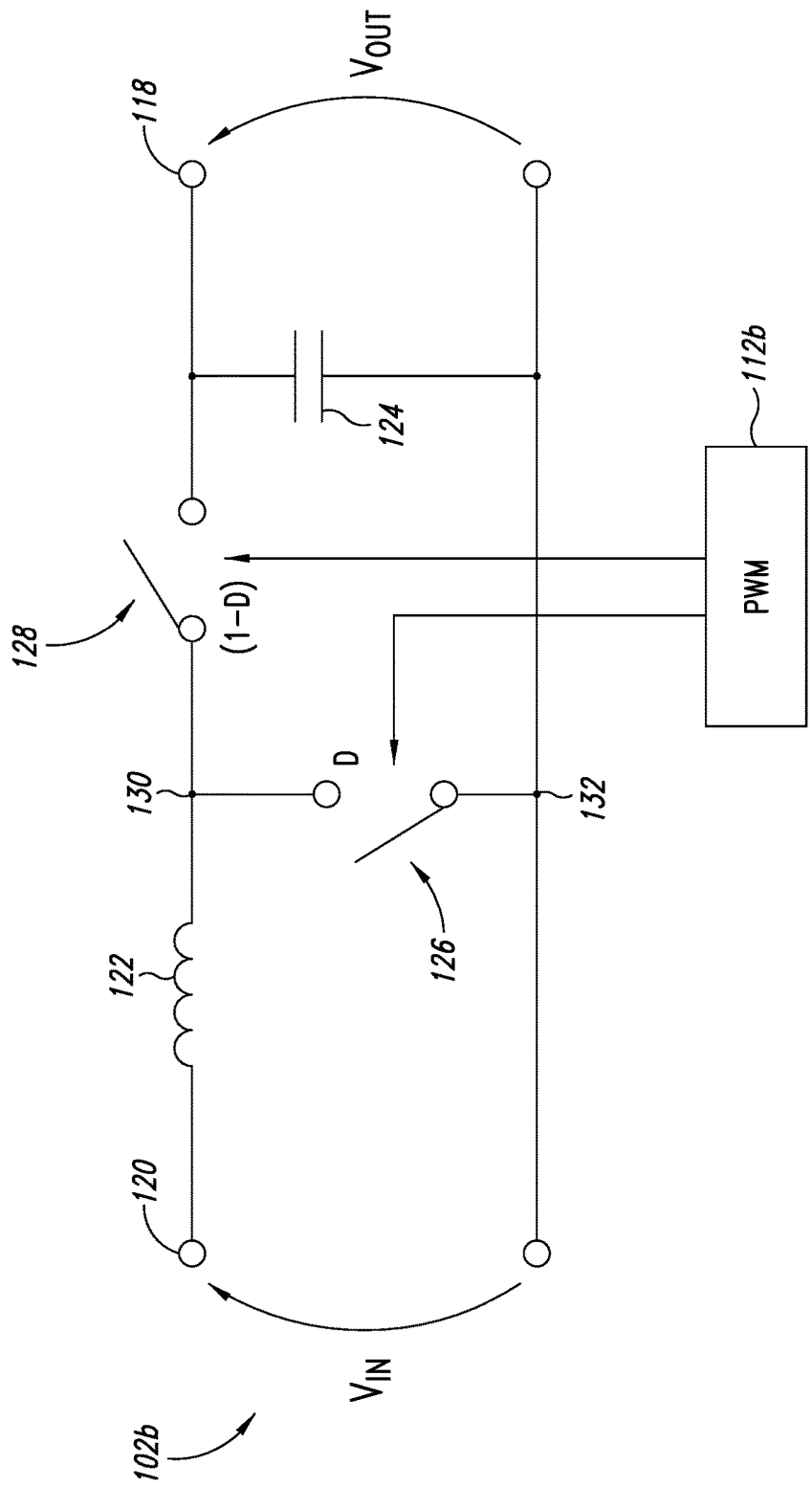
FIG. 2 shows a boost converter coupled to a pulse width modulator.

FIG. 2 shows a boost converter 102b coupled to a pulse width modulator 112b. The boost converter 102b comprises an inductance 122, a capacitance 124, a first switch 126 and a second switch 128. The inductance is coupled between an input terminal 120 of the boost converter 102b and an intermediate node 130. The first switch 126 is coupled between the intermediate node 130 and a grounding node 132, which a ground reference. The second switch 128 is coupled between the intermediate node 130 and the output terminal 118 of the boost converter 102b and the capacitance 124 is coupled between the output terminal 118 and the grounding node 132.

The pulse width modulator 112b controls switching the first switch 126 and the second switch 128 between the electrically conductive state (i.e., when a switch 126, 128 is on) and the electrically non-conductive state (i.e., when a switch 126, 128 is off). The pulse width modulator 112b operates the switches 126, 128 such that the switches 126, 128 alternate between the electrically conductive and non-conductive states over time and at any one point in time the switches 126, 128 have opposite states.

For a first period of time, the pulse width modulator 112b puts the first switch 126 in the electrically conductive state and the second switch 128 in the electrically non-conductive state. For a second period of time, the pulse width modulator 112b reverses the states of the switches 126, 128 and puts the second switch 128 in the electrically conductive state and the first switch 126 in the electrically non-conductive state. The ratio of the length of the first period to the sum of the lengths of the first period and the second period is referred to as the duty cycle of the boost converter 102b and is denoted by 'D' herein. The duty cycle is ranging between 0 and 1.

During the first period, voltage provided by a voltage source coupled to the input terminal 120 and the grounding node 132 causes a flow of current through the inductance 122 and the first switch 126. As a result, the inductance 122 stores energy. At the same time, the capacitance 124 having previously stored a charge discharges into a load coupled between the output terminal 118 and the grounding node 132. Because the second switch 128 is in the electrically non-conductive state, the capacitance 124 is prevented from discharging into the intermediate note 130.

During the second period, the energy stored by the inductance 122 is dissipated to maintain the flow of current through the second switch 128 to the load. The charge of the capacitance 124 is replenished due to the current flowing from the inductance 122 as well as the voltage source. The combination of the current provided by the inductance 122 and the voltage source (at the input terminal 120) charges the capacitance 124 with a higher voltage than that provided by the voltage source. As a result, over the course of its operation, the boost converter 102b is said to boost the input voltage provided by the voltage source. That is, the boost converter 102b outputs an output voltage that is greater than the input voltage. As the duty cycle increases, the output voltage of the boost converter 102b also increases as long as the duty cycle does not exceed the critical duty cycle of the boost converter 102b. It is preferable for the boost converter 102*b* to be operated below the critical duty cycle as increasing the duty above critical duty cycle, results in inverting the gain of the boost converter 102*b* as described herein.

The inductance 122, first switch 126 and second switch 128 of the boost converter 102*b* are non-ideal components and include parasitic resistances. The parasitic resistance of an electric component refers to the internal resistance that is part of the component. The parasitic resistance prevents a component from operating ideally, whereby, for example, an electric switch may not operate as path having zero resistance. Instead, the electric switch may include a parasitic resistance that is typically relatively small. As a result the electric switch may operate as an ideal switch serially coupled to a parasitic resistance.

Accounting for the parasitic resistances of the inductance 122, first switch 126 and second switch 128, the boost converter 102*b* described with reference to FIG. 2 may be modeled as having an ideal inductance 122, first switch 126 and second switch 128 coupled to their respective parasitic resistances.

Figure 3:
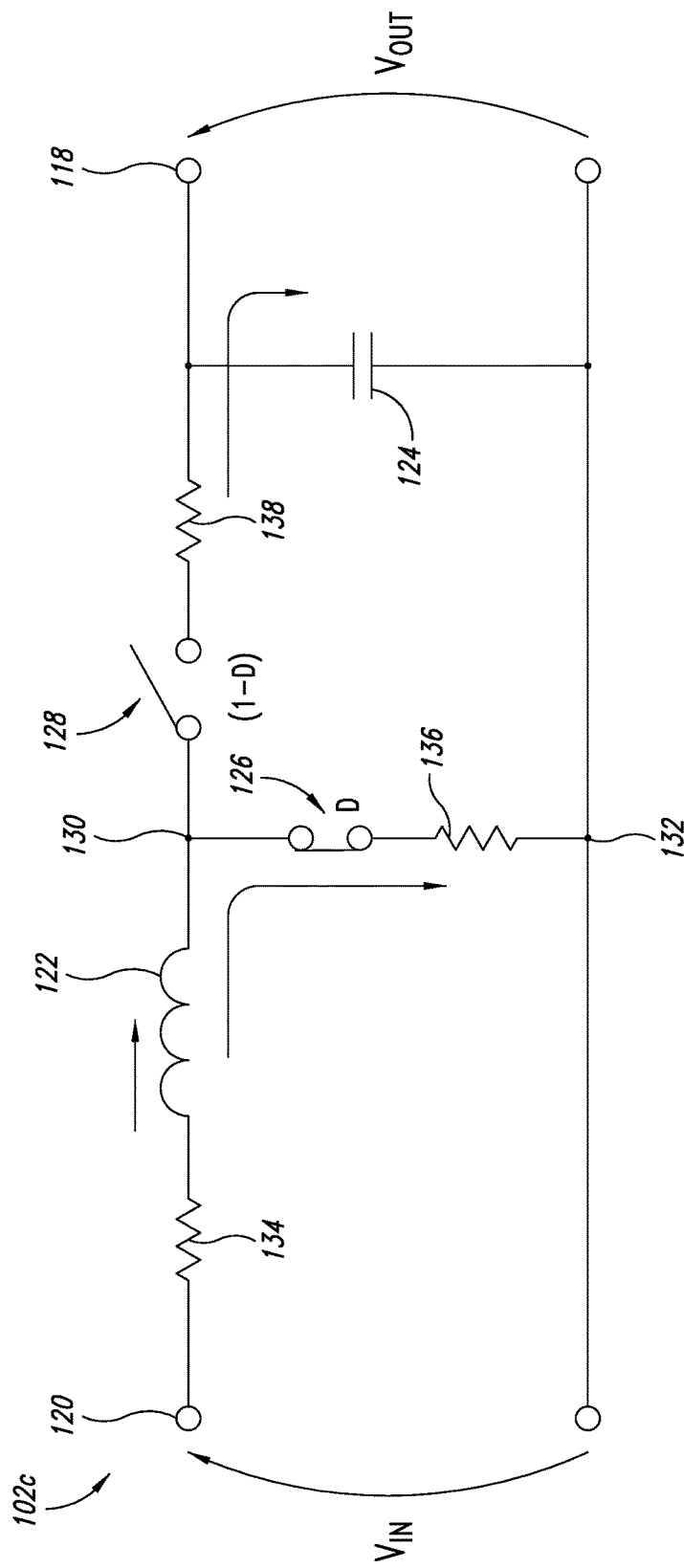
FIG. 3 shows a boost converter having modeled parasitic and load resistances.

FIG. 3 shows a boost converter 102*c* having modeled parasitic resistances. Similar elements of the boost converter 102*c* of FIG. 3 as those of the boost converter 102*b* described with reference to FIG. 2 have the same reference numerals. The inductance 122, first switch 126 and second switch 128 of the boost converter 102*c* are assumed to be ideal components with no parasitic resistances. Their parasitic resistances are respectively serially coupled to these elements.

Accordingly, an inductance resistance 134 is serially coupled to the inductance 122. The inductance resistance 134 is coupled between the inductance 122 and the input terminal 120. A first switch resistance 136 is serially coupled to the first switch 126 (between the first switch 126 and the grounding node 132). A second switch resistance 138 is serially coupled to the second switch 128 (between the second switch 128 and the grounding node 132). It is noted, that the parasitic coupling shown in FIG. 3 is exemplary and in various embodiments, a resistance 134, 136, 138 may be coupled to another terminal of the respective inductance 122, first switch 126 or second switch 128.

The output power of the boost converter 102*c* (i.e., power obtained between the output terminal 118 and the grounding node 132) is represented as:

$$P_{OUT} = P_{IN} - P_{LOSS} \quad \text{Equation (1),}$$

where $P_{IN}$ is the input power supplied between the input terminal 120 and the grounding node 132 and $P_{LOSS}$ is the power loss in the boost converter 102*c*. The power loss in the boost converter 102*c* is dissipated by the parasitic resistances 134, 136, 138 (denoted as $R_{COIL}$, $R_{DOWN}$ and $R_{UP}$, respectively). The input power of the boost converter 102*c* is the product of the input voltage ($V_{IN}$) and the input current to the boost converter 102*c*. It is to be noted, that the input voltage source may be modeled as having is supposed having zero serial resistance. That is, the eventual parasitic resistance of the voltage source is included in the $R_{COIL}$, as they are serially connected. The input current to the boost converter 102*c* entirely flows through the inductance 122 (and its associated inductance resistance 134) and is denoted herein as $I_{COIL}$. Accordingly, the output power of the boost converter 102*c* may be represented as:

$$P_{OUT} = V_{IN}I_{COIL} - I_{COIL}^2(R_{COIL} + DR_{DOWN} + (1-D)R_{UP}) \quad \text{Equation (2).}$$

Because the current that passes through the inductance 122 passes through the first switch 126 and its associated first switch resistance 136 during the first portion of the duty cycle (represented by D), the power dissipated by the first switch resistance 136 is scaled by D. Similarly, the power dissipated by the second switch resistance 138 is scaled by the complementary value, 1-D.

The duty cycle that maximizes the output power is sought. The output power is maximized when its respective derivative has a value of zero as described herein.

Figure 4:
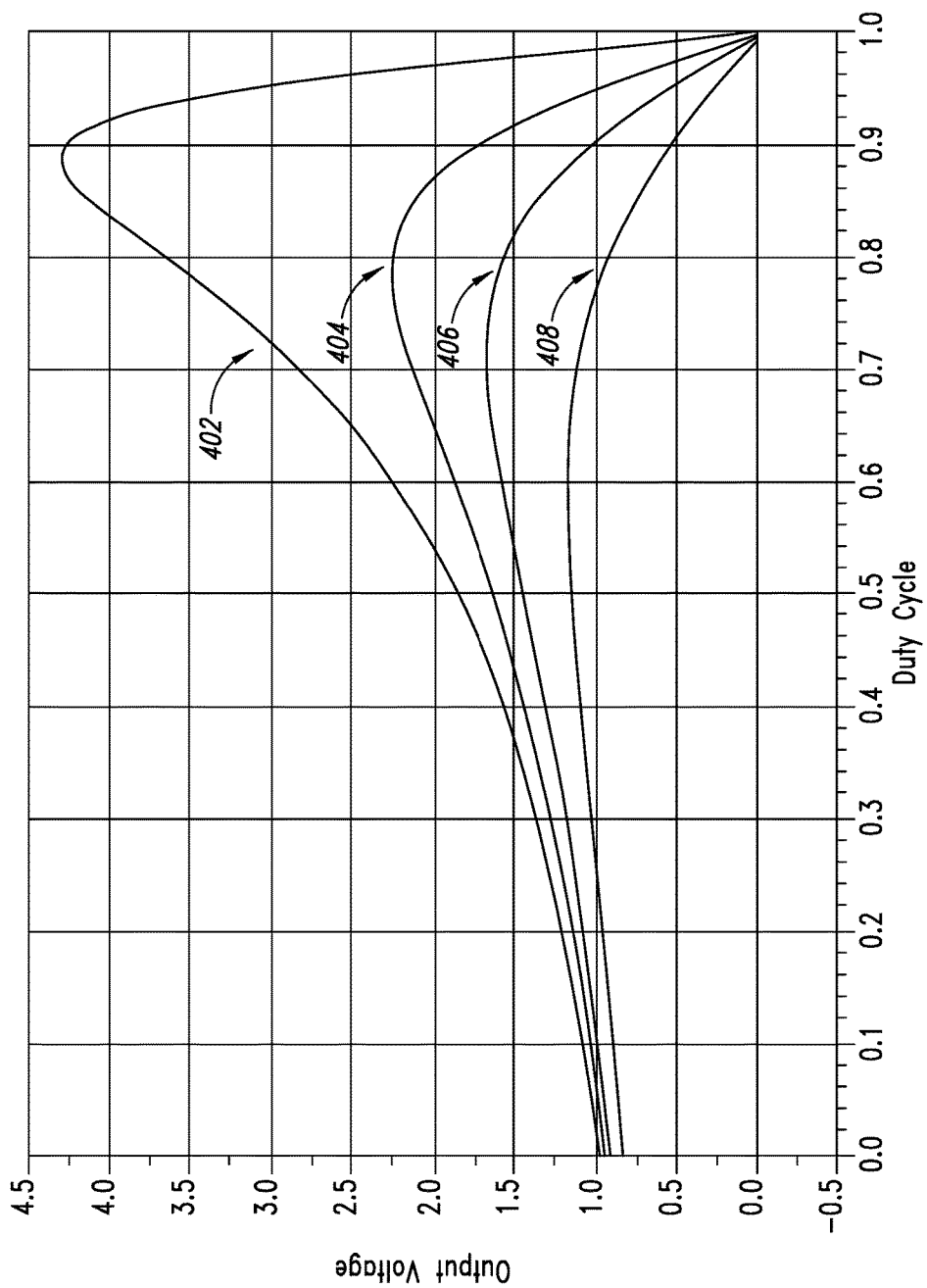
FIG. 4 shows diagrams of output voltages of the boost converter for various parasitic and load resistances as a function of a varied duty-cycle.

FIG. 4 shows diagrams 402-408 of the output voltage of the boost converter 102*c* for various values of the parasitic resistances 134, 136, 138 and resistances of the load 116*a*. In particular diagram 402, shows the output voltage of a boost converter having an input voltage of 1 Volt (V), inductance resistance 134 of 50 milliOhm (mΩ), first switch resistance 136 of 150 mΩ, second switch resistance 138 of 250 mΩ, load resistance of 16 Ohm (Ω) and capacitor 124 capacitance of 4 microFarad (μF). Diagram 404, shows the output voltage of a boost converter having an input voltage of 1V, inductance resistance 134 of 400 mΩ, first switch resistance 136 of 320 mΩ, second switch resistance 138 of 520 mΩ, load resistance of 16Ω and capacitor 124 capacitance of 4 microFarad (μF). Diagram 406, shows the output voltage of a boost converter having an input voltage of 1V, inductance resistance 134 of 1Ω, first switch resistance 136 of 320 mΩ, second switch resistance 138 of 520 mΩ, load resistance of 16Ω and capacitor 124 capacitance of 4 microFarad (μF). Diagram 408, shows the output voltage of a boost converter having an input voltage of 1V, inductance resistance 134 of 1Ω, first switch resistance 136 of 320 mΩ, second switch resistance 138 of 520 mΩ, load resistance of 8Ω and capacitor 124 capacitance of 4 microFarad (μF).

As seen in the diagrams 402-408, there is a critical duty cycle, $D_{CRIT}$, at which the boost converter 102*c* outputs a maximum voltage. In duty cycles higher than the critical duty cycle, there is a negative gain region. In the negative gain region, increasing the duty cycle results in decreasing the output voltage of the boost converter 102*c*.

To determine the critical duty cycle, the output power of the boost converter 102*c* is differentiated with respect to the input current and the equated to zero. Thus:

$$\frac{dP_{OUT}}{dI_{COIL}} = 0. \quad \text{Equation (3)}$$

The input current that maximizes the output power is found to be:

$$I_{COIL} = \frac{1}{2} \frac{V_{IN}}{R_{COIL} + DR_{DOWN} + (1-D)R_{UP}}. \quad \text{Equation (4)}$$

Given the input current of Equation (4), the power loss, which is represented in Equation (2) as $I_{COIL}^2(R_{COIL} + DR_{DOWN} + (1-D)R_{UP})$, is determined to be:

$$P_{Loss} = \frac{1}{4} \frac{V_{IN}^2}{R_{COIL} + DR_{DOWN} + (1-D)R_{UP}}. \quad \text{Equation (5)}$$

Further, the output power, $V_{IN}I_{COIL} - P_{LOSS}$, is determined to be $$P_{OUT} = \frac{1}{4} \frac{V_{IN}^2}{R_{COIL} + DR_{DOWN} + (1-D)R_{UP}}. \quad \text{Equation (6)}$$

The term of the power loss and the output power of the boost converter 102c are the same. Accordingly, it is deduced that the output power of the boost converter 102c is maximized when it is the same as the power loss of the boost converter 102c

The output power of the boost converter 102c may be represented in terms of the input current as $P_{OUT}=I_{COIL}(1-D)V_{OUT}$. By equating the output power term with the power loss term of Equation (2), the following equality is obtained:

$$P_{LOSS}=P_{OUT}$$

$$I_{COIL}(1-D)V_{OUT}=I_{COIL}^2(R_{COIL}+DR_{DOWN}+(1-D)R_{UP}) \quad \text{Equation (7)}$$

Advantageously, the square of $I_{COIL}$ is eliminated. Equation (7) can also be represented as:

$$\underbrace{\frac{(1-D)V_{OUT}}{\text{Output Voltage (Complementary Period)}}}_{} = \underbrace{\frac{I_{COIL}R_{COIL}}{V_{COIL\_AVG}} + \frac{I_{COIL}R_{DOWN}D}{V_{DOWN\_AVG}} + \frac{I_{COIL}R_{UP}(1-D)}{V_{UP\_AVG}}}_{} \quad \text{Equation (8)}$$

Accordingly, the output power of the boost converter 102c is maximized when the sum of the of the average voltages across the inductance resistance 134, the first switch resistance 136 and the second switch resistance 138 is the same as the average output voltage scaled by the complementary period (1−D) of the duty cycle. The various voltages represented in Equation (8) may be sensed and the duty cycle may be modified from 0 to 1 in order to obtain an output power-maximizing duty cycle that having sensed voltages that meet the equality of Equation (8).

Figure 5:
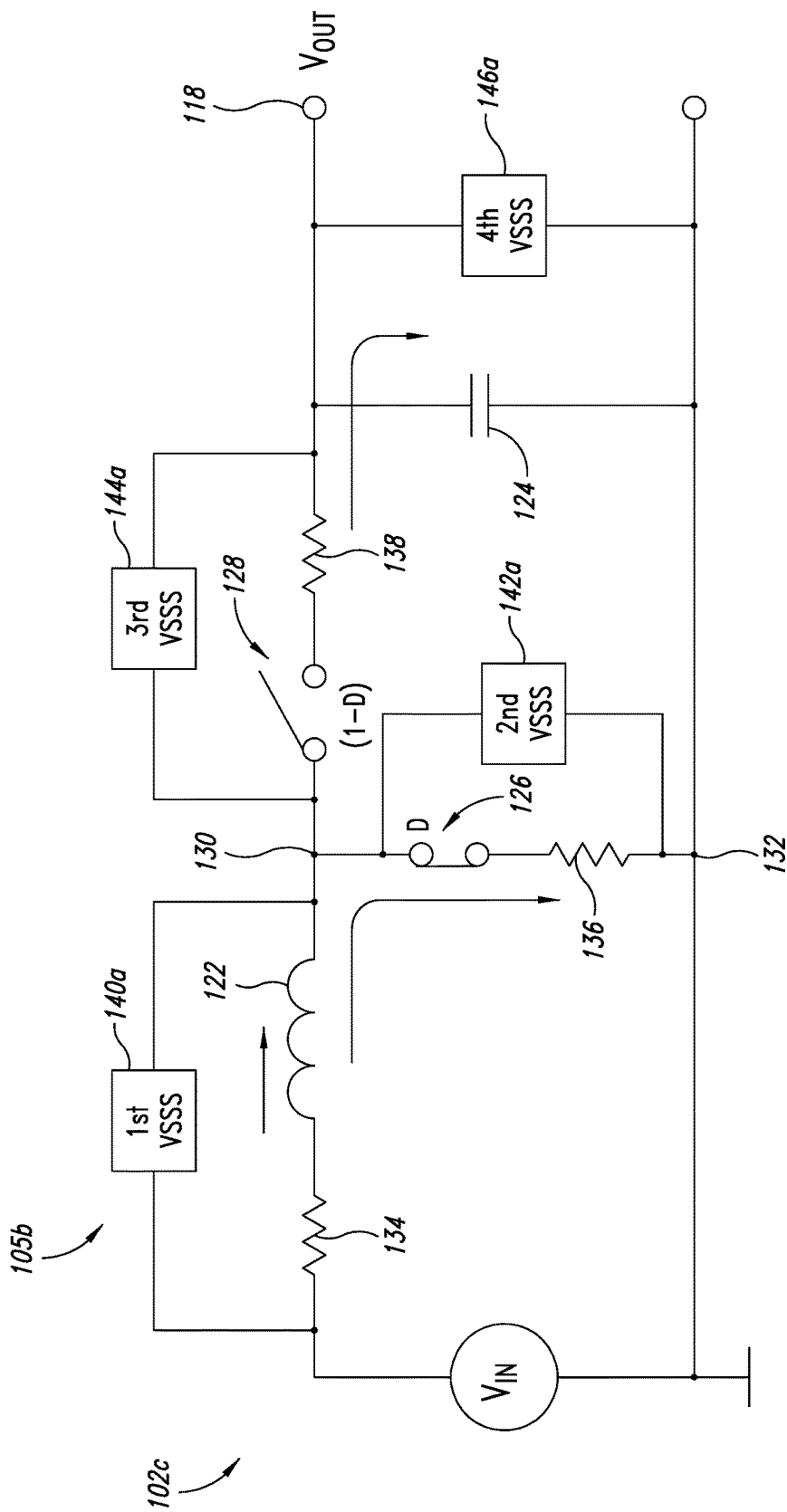
FIG. 5 shows the boost converter coupled to a voltage sensing stage.

FIG. 5 shows the boost converter 102c coupled to a voltage sensing stage 105b. The voltage sensing stage 105b comprises four voltage sensing sub-stages 140a-146a. Each voltage sensing sub-stage 140a-146a senses a respective voltage term of Equation (8). The voltage sensing sub-stages 140a-146a may be RC filters that may sense the average voltage across respective parasitic resistances and the output voltage. Further, a voltage sensing sub-stage 140a-146a may include scaling circuit where necessary to scale the voltage by the complementary period, 1−D.

A first voltage sensing sub-stage 140a senses the average voltage across the inductance 122 and thus, the average voltage across the inductance resistance 134. A second voltage sensing sub-stage 142a senses the average voltage across the first switch resistance 136 and a third voltage sensing sub-stage 144a senses the average voltage across the second switch resistance 138. A fourth voltage sensing sub-stage 146a senses the average output voltage conditional upon output voltage being provided only over the second period of the duty cycle.

The first voltage sensing sub-stage 140a is coupled between the input terminal 120 and the intermediate node 130. The second voltage sensing sub-stage 142a is coupled between the intermediate node 130 and the grounding node 132. The third voltage sensing sub-stage 144a is coupled between the intermediate node 130 and the output terminal 118. The fourth voltage sensing sub-stage 146a is coupled between the output terminal 118 and the grounding node 132. A voltage sensing sub-stage 140a-146a may be a resistance-capacitance (RC) filter as described herein. Furthermore, a voltage sensing sub-stage may also include a voltage scaling stage. The voltage scaling stage in included in a voltage sensing sub-stage if the sensed voltage is assumed to be provided over only one period of the duty cycle. For example, the fourth voltage sensing sub-stage 146a has a voltage scaling stage because it senses (1−D) $V_{OUT}$ (i.e., the output voltage averaged over time and only provided over the second period of the duty).

Figure 6:
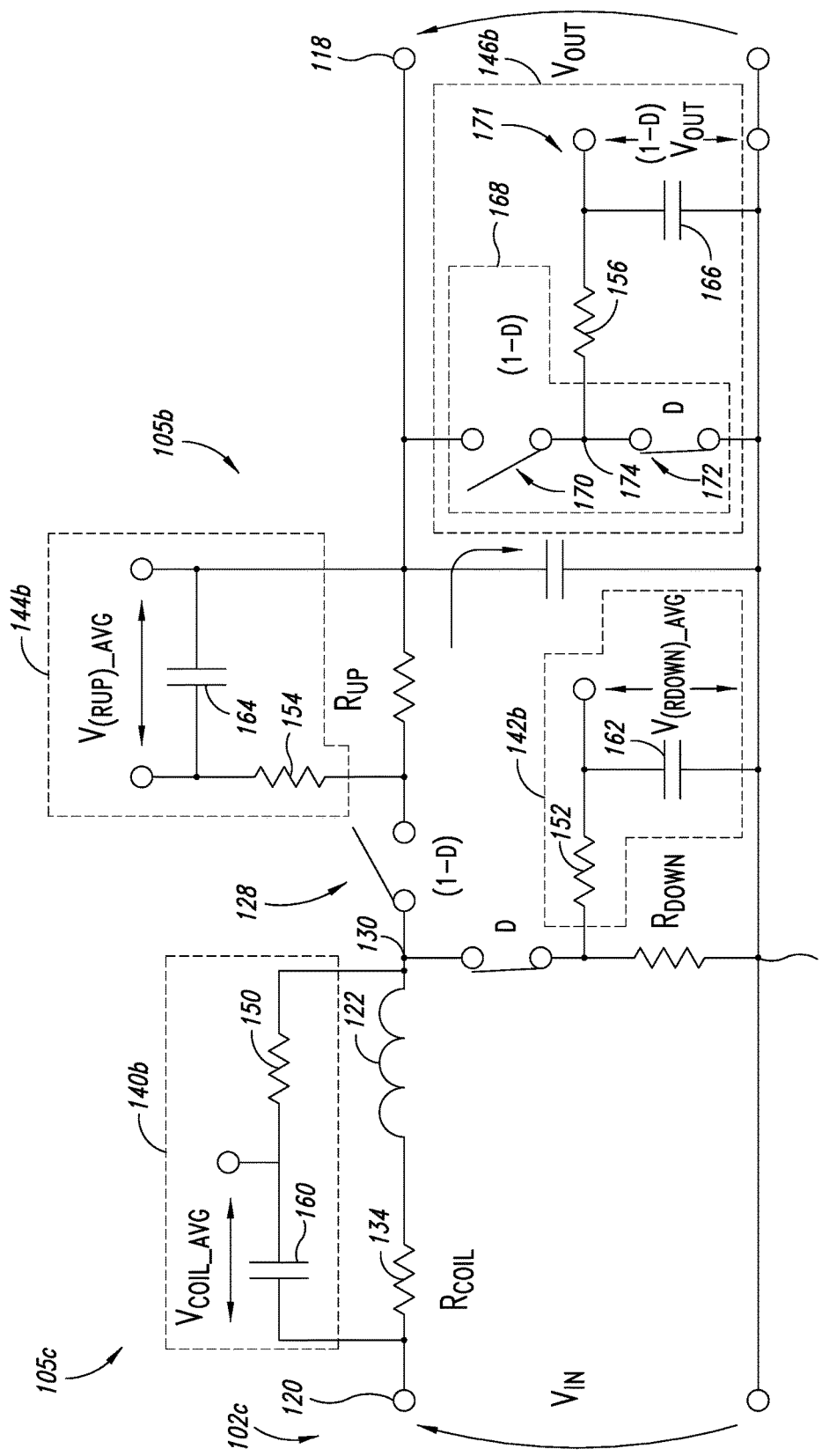
FIG. 6 shows the boost converter coupled to a voltage sensing stage in accordance with an embodiment.

FIG. 6 shows the boost converter 102c coupled to a voltage sensing stage 105c in accordance with an embodiment. The voltage sensing stage 105c includes a plurality of voltage sensing sub-stages 140b-146b. Each voltage sensing sub-stage 140b-146b includes an RC filter and respectively comprises a resistance 150-156 and a capacitance 160-166 respectively serially coupled. In addition to the serially coupled resistance 156 and capacitance 166, the fourth voltage sensing sub-stage 148b also comprises a second period voltage scaling stage 168. The second period voltage scaling stage 168 activates the output voltage only over the second period of the duty cycle. The RC filter of the fourth voltage sensing sub-stage 148b senses an average voltage conditional upon the output voltage being provided only over the second period of the duty cycle.

The second period voltage scaling stage 168 includes two switches; a first switch 170 coupled between the output terminal 118 and an intermediary node 174 and a complementary switch 172 coupled between the intermediary node 174 and the grounding node 132. The first switch 170 is operable to switch to the electrically conductive state during the second period (off period) of the duty cycle and switch to the electrically non-conductive state during the first period (on period) of the duty cycle. The second switch 172 has the reverse state of the first complementary switch 170. The RC filter 171 of the fourth voltage sensing circuit 148b is coupled between the intermediary node 174 and the grounding node 132. The RC filter 171 of the fourth voltage sensing circuit 148b senses an average voltage conditional upon the output voltage being provided only over the second period of the duty cycle. The voltage sensed using a voltage sensing sub-stage 140b-146b is read across the respective capacitor 160-166 of the sub-stage.

Figure 7:
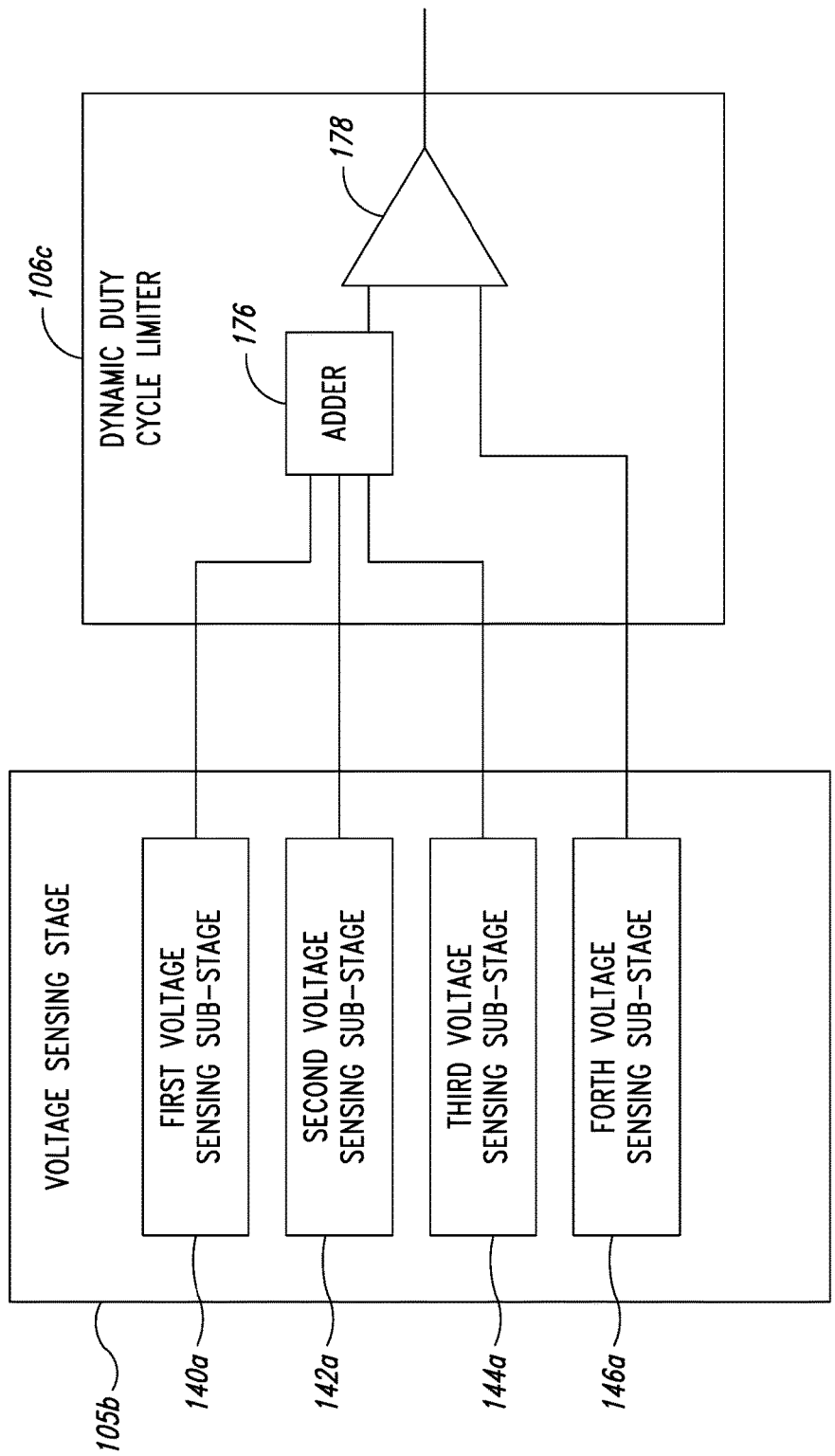
FIG. 7 shows the voltage sensing stage described with reference to FIG. 5 coupled to a dynamic duty cycle limiter.

FIG. 7 shows the voltage sensing stage 105b described with reference to FIG. 5 coupled to a dynamic duty cycle limiter 106c. The voltage sensing stage 105b comprises the plurality of voltage sensing sub-stages 140a-146a. The dynamic duty cycle limiter 106c comprises an adder 176 and a comparator 178.

An output of the first, second and third voltage sensing sub-stages 140a-144a is coupled to an input of the adder 178. An output of the adder 178 and an output of the fourth voltage sensing sub-stage 146a are respectively coupled to inputs of the comparator 178.

The first, second and third voltage sensing sub-stages 140a-144a respectively output sensed voltages to the adder 176. The adder 176 receives the outputs of the first, second and third voltage sensing sub-stages 140a-144a. The adder 176 adds the received voltages to arrive at the term of the right side of Equation (8). The adder 176 outputs the sum to the comparator 178. The fourth voltage sensing sub-stage 146a outputs an output voltage that is representative of the term of the left side of Equation (8). The comparator 178 compares the output of the fourth voltage sensing sub-stage 146a and the output of the adder 176. The comparator 178 outputs a difference between the voltages. The difference is used to limit changes to the duty cycle of the boost converter 102c.

The output power maximizing equality of Equation (8) requires four voltages to be sensed which requires use of four voltage sensing circuits. Acknowledging that the voltage across the inductance resistance 134 ($I_{COIL}R_{COIL}$) can be represented as the sum of the voltage across the inductance resistance 134 during over first period of the duty cycle ($DI_{COIL}R_{COIL}$) and the voltage across the inductance resistance 134 over the second period of the duty cycle (($1-D$) $I_{COIL}R_{COIL}$), Equation (8) can re-written as:

$$(1-D)V_{OUT} = DI_{COIL}R_{COIL} + (1-D)I_{COIL}R_{COIL} + DI_{COIL} R_{DOWN}(1-D)I_{COIL}R_{UP}$$ Equation (9).

Collecting the D terms and 1-D terms on opposite sides of the equality, Equation (9) can be written as:

$$(1-D)(V_{OUT} - I_{COIL}R_{COIL} - I_{COIL}R_{UP}) = D(I_{COIL}R_{COIL} + I_{COIL}R_{DOWN})$$ Equation (10).

Per Equation (10) only two voltages need to be sensed and compared to obtain the duty cycling-maximizing the output power.

Figure 8:
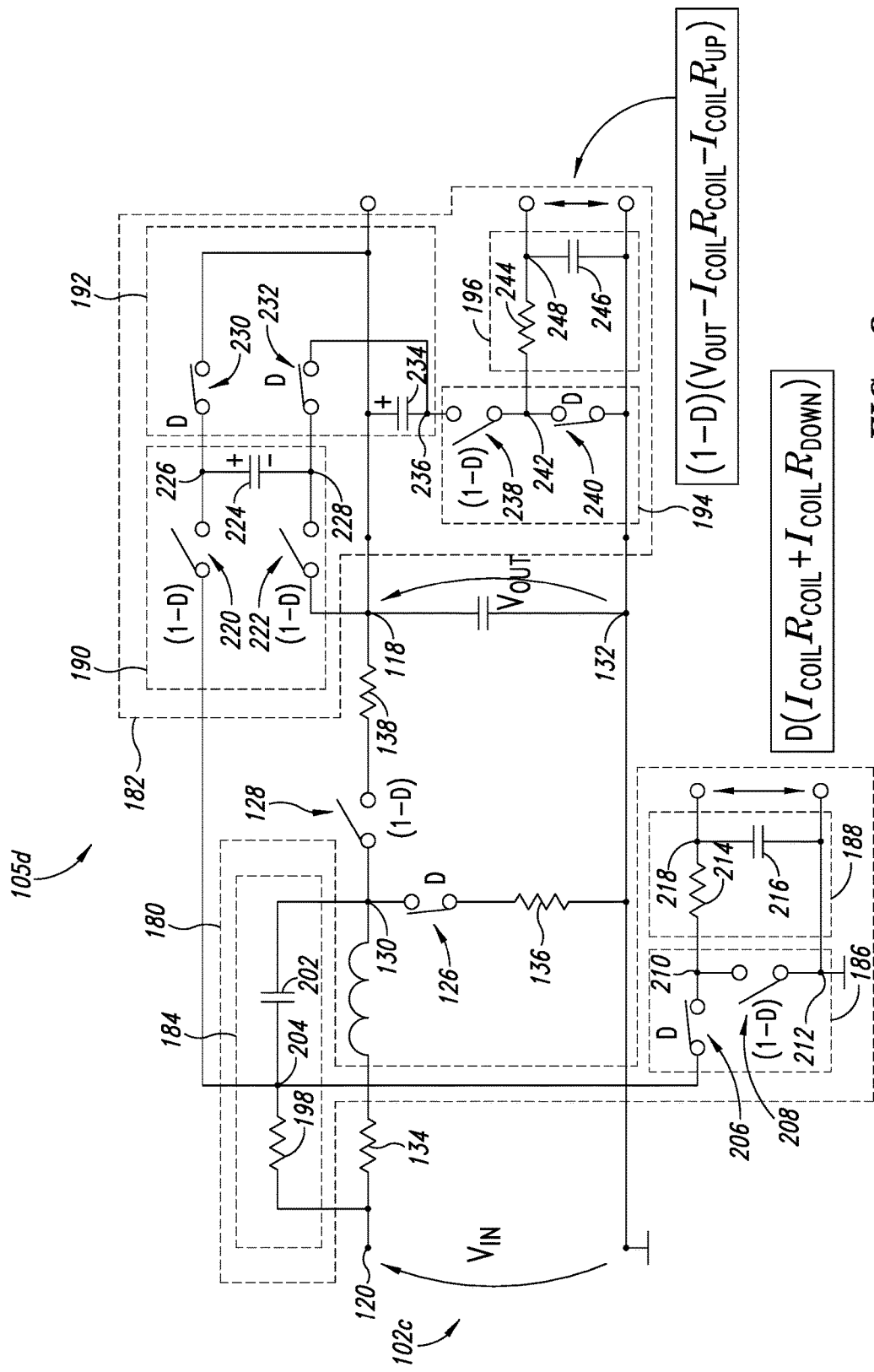
FIG. 8 shows the boost converter coupled to a voltage sensing stage in accordance with an embodiment.

FIG. 8 shows the boost converter 102c coupled to a voltage sensing stage 105d in accordance with an embodiment. The voltage sensing stage 105d comprises a first voltage sensing sub-stage 180 and a second voltage sensing sub-stage 182. The first voltage sensing sub-stage 180 comprises a first RC filter 184, a first period voltage scaling stage 186 and a second RC filter 188. The second voltage sensing sub-stage 182 comprises a voltage summation stage 190, a voltage subtraction stage 192, a second period voltage scaling stage 194 and a third RC filter 196.

In the first voltage sensing sub-stage 180, the first RC filter 184 is coupled between the input terminal 120 and the intermediate node 130. The first period voltage scaling stage 186 is coupled to the first RC filter 184 and the second RC filter 188 is coupled to the first period voltage scaling stage 186.

In the second voltage sensing sub-stage 182, the voltage summation stage 190 is coupled to both the first RC filter 184 of the first voltage sensing sub-stage 180 and the output terminal 118 of the boost converter 102c. The voltage subtraction (inverting) stage 192 is coupled to the voltage summation stage 190 and the output terminal 118 of the boost converter 102c. The second period voltage scaling stage 194 is coupled to the voltage subtraction stage 192 and the grounding node 132 of the boost converter 102c. The third RC filter 196 is coupled to the second period voltage scaling stage 194 and the grounding node 132 of the boost converter 102c.

The first voltage sensing sub-stage 180 is used to sense voltage that represents the right side of Equation (10) and the second voltage sensing sub-stage 182 is used to sense voltage that represents the left of Equation (10). The sensed voltage and then compared and used to limit changes to the duty cycle of the boost converter 102c as described herein.

In particular, the first RC filter 184 senses the voltage across the inductance resistance 134. The first period voltage scaling stage 186 scales the voltage as if supplied only over the first period of the duty cycle. The second RC filter 188 senses the scaled voltage which represents the right side of Equation (10).

In the second voltage sensing sub-stage 182, the voltage summation stage 190 sums the voltages across the second switch resistance 138 and inductance resistance 134. The voltage subtraction stage 192 subtracts the summed voltage from the output voltage. The second period voltage scaling stage 194 scales the outcome of the voltage subtraction stage 192 to be provided only over the second period of the duty cycle. The third RC filter 196 senses the voltage scaled by the second period voltage scaling stage 194. The voltage sensed by the third RC filter 196 represents the left side of Equation (10). Resistance and capacitance values of the RC filter may be selected such that the cut-off frequency of the RC filter is below the main switching frequency.

The first RC filter 184 comprises a first resistance 198 and a first capacitance 202 that are serially coupled with a first node 204 therebetween. The first period voltage scaling stage 186 comprises a first switch 206 and a second switch 208 that are serially coupled with a second node 210 therebetween. The first switch 206 is a first period switch (it is in the electrically conductive state in the first period of the duty cycle and in the electrically non-conductive state in the second period of the duty cycle). Conversely, second switch 208 is a second period switch (it is in the electrically conductive state in the second period of the duty cycle and in the electrically non-conductive state in the first period of the duty cycle).

The first switch 206 is coupled to the first node 204 of the first RC filter 184 and the second node 210. The second switch 208, on the other hand, is coupled to the second node 210 and a third node 212. The third node 212 may be a grounding node.

The second RC filter 188 is coupled between the second and third nodes 210, 212. The second RC filter comprises a second resistance 214 and a second capacitance 216 that are serially coupled with a fourth node 218 therebetween. The sensed voltage of the first voltage sensing stage 184 is sensed across the second capacitance 216 (i.e., the voltage difference between the third and fourth nodes 212, 218).

Turning to the second voltage sensing sub-stage 182, the voltage summation stage 190 comprises first and second switches 220, 222 and a first capacitance 224. The first and second switches 220, 222 are second period switches. The first switch 220 is coupled between the first node 204 of the first voltage sensing sub-stage 180 and a first node 226 of the voltage summation stage 190. The second switch 222 is coupled between the output terminal 118 and a second node 228 of the voltage summation stage 190. The first capacitance 224, on the other hand, is coupled between the first node 226 and the second node 228. The first capacitance 224 stores the voltage summed by the voltage summation stage 190.

The voltage subtraction stage 192 comprises third and fourth switches 230, 232 and second capacitance 234. The third and fourth switches 230, 232 are first period switches. The third switch 230 is coupled between the first node 226 of the voltage summation stage 190 and the output terminal 118 of the boost converter 102c. The fourth switch 232 is coupled between the second node 228 of the voltage summation stage 190 and a third node 236. The second capacitance 234 is coupled between the third node 236 and the output terminal 118. The second capacitance 234 stores a voltage that is a difference between the output voltage of the boost converter 102c and the voltage stored in the first capacitance 224.

The second period voltage scaling stage 194 comprises fifth and sixth switches 238, 240 that are serially coupled with a fourth node 242 therebetween. The fifth switch 238 is a second period switch, whereas the sixth switch 240 is a first period switch. The fifth switch 238 is coupled between the third node 236 and the fourth node 242. The sixth switch 240 is coupled between the fourth node 242 and the grounding node 132.

The third RC filter 196 is coupled in parallel with the sixth switch 240 such that the voltage sensed using the third RC filter 196 is scaled by the complementary duty cycle. The third RC filter 196 comprises a third resistance 244 and a third capacitance 246 that are serially coupled with one another with an intermediary node 248 therebetween. The third RC filter 196 is coupled between the fourth node 248 and the grounding node 132. The voltage represented by the left hand side of Equation (10) may be sensed across the third capacitance 246 (i.e., between the intermediary node 248 and the grounding node 132).

The voltage summation stage 190 sums the voltage across both the inductance resistance 134 and the second switch resistance 138 over the second period and deposits the sum in the and first capacitance 224. During the first period, the voltage subtraction stage 192 stores in the second capacitance 234 a voltage that is the same as the voltage stored in the first capacitance 224.

The second period voltage scaling stage 194 scales the voltage stored in the second capacitor 234 by the complementary duty cycle (1−D). The third RC filter 196 sense the voltage scaled by the second period voltage scaling stage 194. It is noted that the switches 206, 208 of the first voltage sensing sub-stage 180 and the switches 220, 222, 230, 232, 238, 240 of the second voltage sensing sub-stage 182 are controlled similarly as the first switch 126 and the second switch 128 of the boost converter 102c. The switches of the first and second voltage sensing sub-stage 180, 182 may be controlled by the pulse width modulator 102a described with reference to FIG. 1 in accordance with the duty cycle used to operate the boost converter 102c. First period switches 126, 206, 230, 232, 240 are closed in the first period of the duty cycle and opened in the second period. Conversely, second period switches 128, 208, 220, 222, 238 are closed in the second period of the duty cycle and opened in the first period.

In an embodiment, the second voltage sensing sub-stage 182 may include an inverting RC filter that performs summation and subtraction of voltages performed by the voltage summation and subtraction stages 190, 192.

Figure 9:
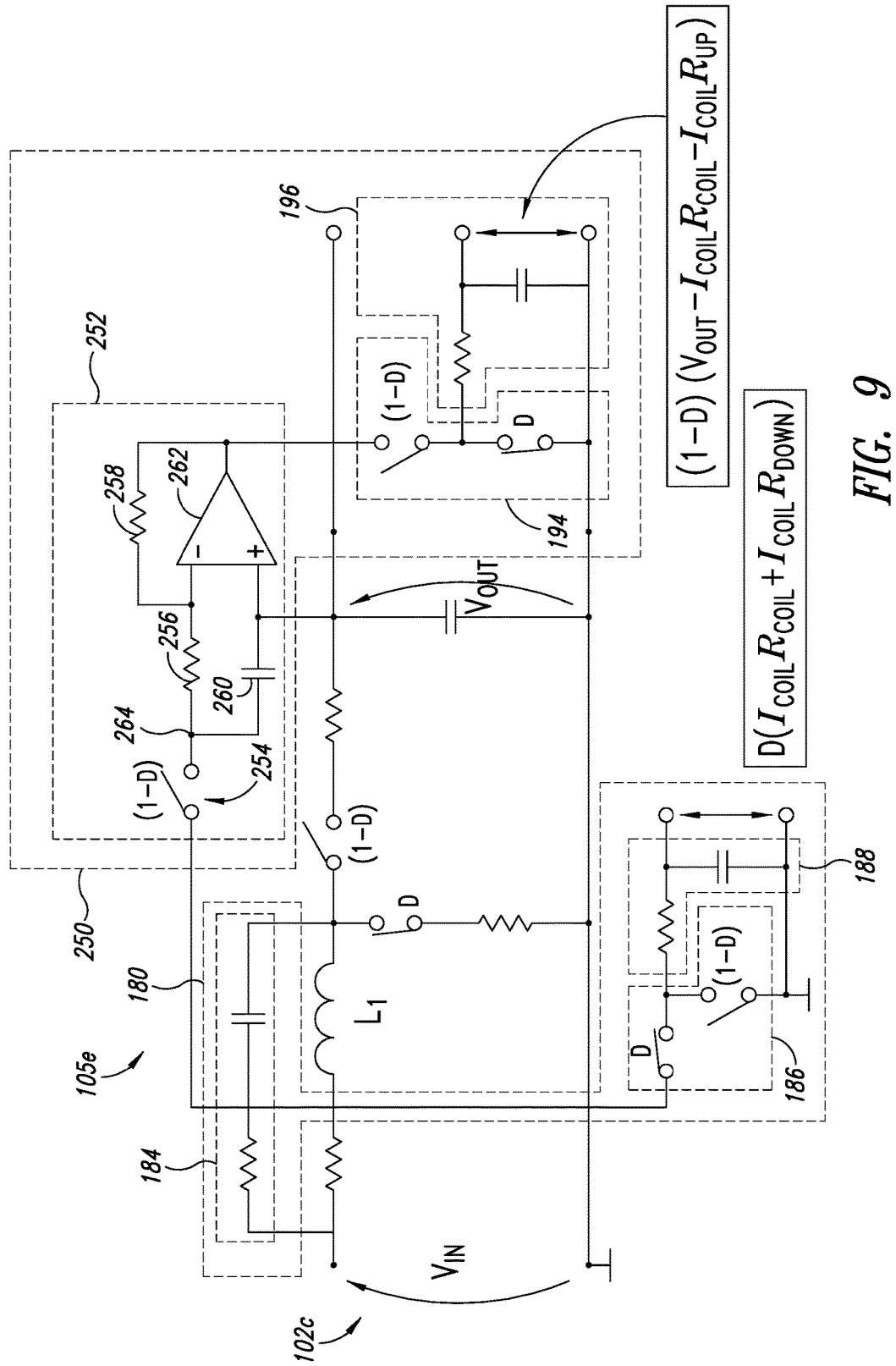
FIG. 9 shows the boost converter coupled to a voltage sensing stage in accordance with an embodiment.

FIG. 9 shows the boost converter 102c coupled to a voltage sensing stage 105e in accordance with an embodiment. Similar elements of FIG. 9 as those described with reference to FIG. 8 have the same reference numerals. The voltage sensing stage 105e comprises the first voltage sensing sub-stage 180 and a second voltage sensing sub-stage 250. The second voltage sensing sub-stage 250 comprises a voltage summation and subtraction stage 252, the second period voltage scaling stage 194 and the third RC filter 196.

The voltage summation and subtraction stage 252, at its inputs, is coupled to the first voltage sensing sub-stage 180 and the output terminal 118. An output of the voltage summation and subtraction stage 252 is coupled to the second period voltage scaling stage 194. The third RC filter 196 is coupled to the second period voltage scaling stage 194.

The voltage summation and subtraction stage 252 receives the output voltage from the output terminal 119 of the boost converter 102c. The voltage summation and subtraction stage 252 also receives from the first voltage sensing sub-stage 180 a voltage, supplied only over the second period of the duty cycle, that is a sum of the output voltage, the voltage drop across the inductance resistance 134 and the voltage drop across the second switch resistance 138. The voltage summation and subtraction stage 252 determines the difference between the output voltage and the sum of the voltage drops across the inductance resistance 134 and the second switch resistance 138 as required per Equation (10). The voltage summation and subtraction stage 252 outputs the determined voltage to the second period voltage scaling stage 194. The second period voltage scaling stage 194 scales the voltage as if supplied only over the second period.

The third RC filter 196 senses the voltage scaled by the second period voltage scaling stage 194.

The voltage summation and subtraction stage 252 comprises a first switch 254 that is a second period switch, a first resistance 256, a second resistance 258, a first capacitance 260 and an operational amplifier 262. The first switch 254 is coupled between the first node 204 of the first RC filter 184 and an intermediary node 264 of the voltage summation and subtraction stage 252. The first resistance 256 is coupled between the intermediary node 264 and an inverting input of the operational amplifier 262. The first capacitance 260 is coupled between the intermediary node 264 and a non-inverting input of the operational amplifier 262. The non-inverting input of the operational amplifier 262 is also coupled to the output terminal 118 of the boost converter 102c. The second resistance 258 is coupled between the inverting input of the operational amplifier 262 and an output of the operational amplifier 262. The output of the operational amplifier 262 is coupled to the second period voltage scaling stage 194. In particular, the output of the operational amplifier is coupled to the fifth switch 238 of the second period voltage scaling stage 194 so as to provide the output voltage of the operational amplifier 262 for scaling.

The non-inverting input of the operational amplifier 262 receives the output voltage of the boost converter 102c. The intermediary node 264 of the voltage summation and subtraction stage 252 on the other hand receives a voltage that is the sum of the output voltage, the voltage drop across the second switch resistance 138 and the voltage drop across the inductance resistance 134. The voltage drop across the capacitance is the same as the sum of the voltages across inductance resistance 134 and the second switch resistance 138. Accordingly, the non-inverting input of the operational amplifier 262 receives the output voltage of the boost converter 102c. The inverting input of the operational amplifier 262 receives the sum of the voltages across inductance resistance 134 and the second switch resistance 138. The operational amplifier 262 outputs a voltage representing the left term of Equation (10) absent the voltage scaling.

As described with reference to FIG. 8, the combination of the second period voltage scaling stage 194 and the third RC filter 196 is used to sense a voltage representing the left term of Equation (10). It is to be noted, that the current through resistance 256, 258 may be very low (for example, close to zero), which can be obtained by very large resistances 256, 258.

Figure 10:
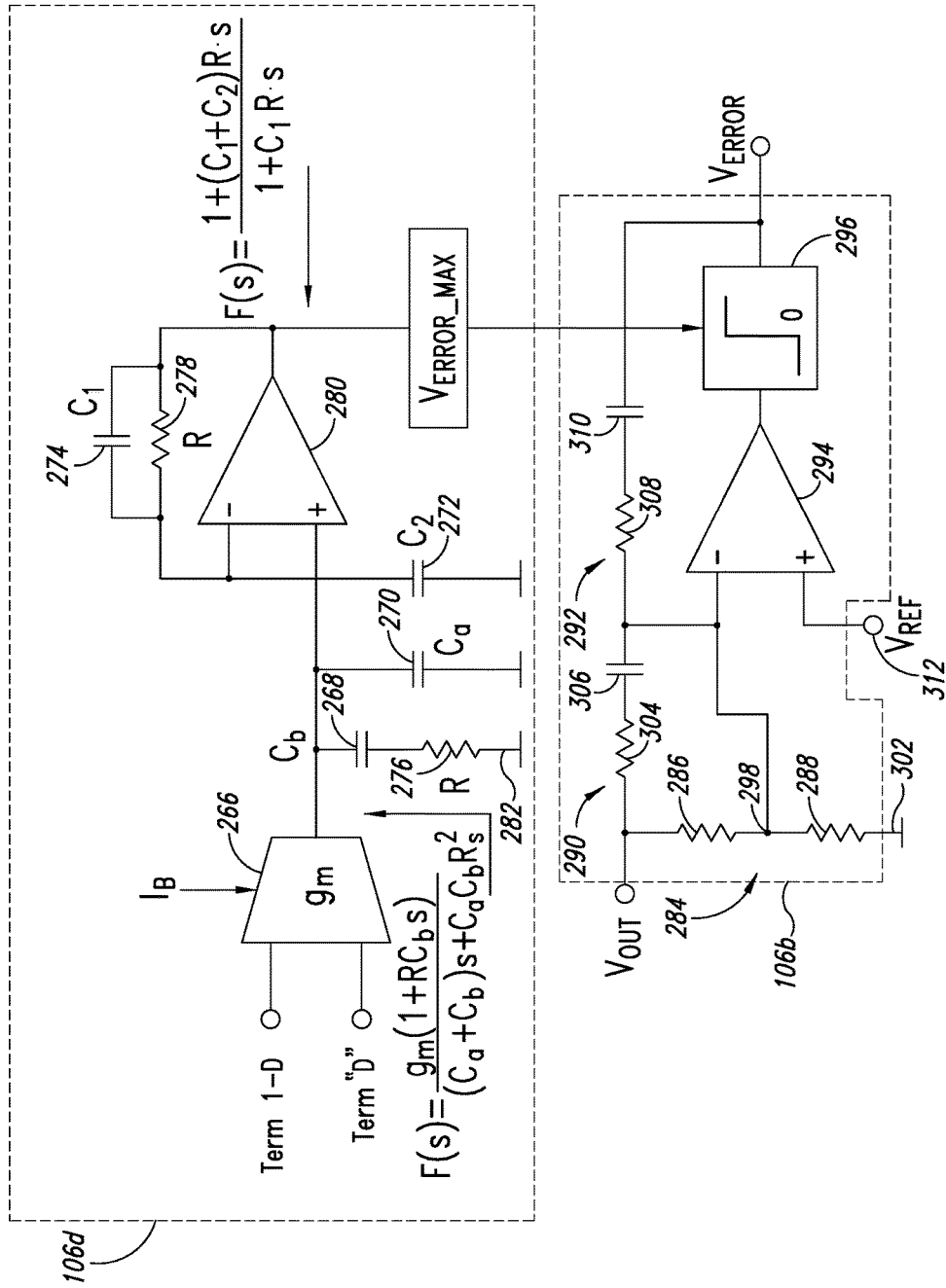
FIG. 10 shows a dynamic duty-cycle limiter coupled to a feedback controller in accordance with an embodiment.

FIG. 10 shows a dynamic duty-cycle limiter 106d coupled to a feedback controller 106b in accordance with an embodiment. The dynamic duty-cycle limiter 106d and the feedback controller 106b may be part of a feedback stage such as the feedback stage 101a described with reference to FIG. 1. The dynamic duty cycle limiter 106d has inputs that are respectively coupled to outputs of the voltage sensing stages 105d, 105e (not shown) described with reference to FIGS. 8 and 9, respectively. An output of the dynamic duty cycle limiter 106d is coupled to an output of the feedback controller 106b. An output of the feedback controller 106b may be coupled to an input of a pulse width modulator (not shown), such as the pulse width modulator 112a described with reference to FIG. 1.

The duty-cycle limiter 106d comprises a first amplifier 266, a second amplifier 280, first, second, third and fourth capacitances 268-274 and first and second resistances 276, 278. The first amplifier 266, which may be an operational transconductance amplifier, has an output terminal coupled to a non-inverting input terminal of the second amplifier 280. Advantageously, the inputs of the amplifier 266 present very high (ideally infinite) input impedance. Similarly, output of the amplifier 280 presents low (ideally zero) output impedance. The first capacitance 268 is serially coupled to the first resistance 276 between the output terminal of the first amplifier 266 and a grounding node 282. The second capacitance is also coupled between the output terminal of the first amplifier 266 and the grounding node 282. The first amplifier 266 has two voltage input nodes for receiving sensed voltages and comparing the sensed voltages as described herein. Furthermore, the first amplifier 266 has biasing current input node for receiving a biasing current.

The third capacitance 272 is coupled between an inverting input of the second amplifier 280 and the grounding node 282. The second resistance 278 and the fourth capacitance 274 are both coupled in parallel with respect to each other between the inverting input of the second amplifier 280 and an output of the second amplifier 280.

The dynamic duty feedback controller 106b comprises a voltage divider 284 (having first and second voltage divider resistances 286, 288), first and second RC circuits 290, 292, an operational amplifier 294 and a voltage limiter 296. The first RC circuit 290 comprises a first resistance 304 and a first capacitance 306 and the second RC circuit 292 comprises a second resistance 308 and a second capacitance 310.

The voltage divider 284 is coupled between an output terminal of a boost converter (such as output terminal 118 of the boost converter 102c described herein) and a grounding node 302, which may be connected to ground. An intermediary node 298 of the voltage divider 284 to which both first and second voltage divider resistances 286, 288 are coupled is coupled to an inverting input of the operational amplifier 294.

The first RC circuit 290 is coupled between the output terminal 118 and the inverting input of the operational amplifier 294 and the second RC circuit 292 is coupled between the inverting input of the operational amplifier 294 and an output of the voltage limiter 296. A non-inverting input of the operational amplifier 294 is to a reference voltage node 312 that supplies a reference voltage. Furthermore, an output of the operational amplifier 294 is coupled to a first input of the voltage limiter 296. A second input of the voltage limiter 296 is coupled to an output of the duty-cycle limiter 106d. An output of the voltage limiter 296 may be coupled to an input of pulse width modulator such as the pulse width modulator 112a described with reference to FIG. 1.

In the duty-cycle limiter 106d, the first amplifier 266, which may be an operational transconductance amplifier as described herein, is a voltage controlled current source. The first amplifier 266 receives, at its voltage inputs, the voltages sensed by a voltage sensing stage, such as the voltage sensing stages 105d, 105e described with reference to FIGS. 8 and 9, respectively. For example, a first voltage input of the first amplifier 266 may be coupled to node 248 and a second voltage input of the first amplifier 266 may be coupled to node 218 described with reference to FIG. 8. Accordingly, the first voltage input of the first amplifier 266 receives the voltage represented by the left term of Equation (10), whereas the second voltage input of the first amplifier 266 receives the voltage represented by the right term of Equation (10). The first amplifier 266 compares the voltages and outputs, at its output, current that is representative of the difference between the voltages. The transfer function of the first amplifier 266 is a function of the first resistance 276 and the first and second capacitances 268, 270.

The second amplifier 280 has a transfer function that is function of the third and fourth capacitances 272, 274 and the second resistance 174. It also created a "low impedance" output required for the limiter 296. The second amplifier 280 receives, at its non-inverting input, the output of the first amplifier 266. The second amplifier 280, which may operate as a derivative stage, outputs a voltage that is representative of a change to the duty cycle required to reach the critical duty cycle. When the duty cycle is to be limited, the output of the second amplifier 280 limits the value of the output voltage, $V_{ERROR}$. When this maximum voltage is supplied to the pulse width modulator, the boost converter operates at the critical duty cycle. If the boost converter 102c is already operating at the critical duty cycle, the voltage inputs to the first amplifier 266 are expected to be the same. Accordingly, the maximum voltage difference output by the second amplifier 280 will be $V_{ERROR}$.

Turning to the feedback controller 106b, the voltage divider 284 scales the output voltage to the reference voltage. For example, if the reference voltage is 1V and the output voltage is sought to be 3V, then the ratio of the resistance values of the first and second voltage divider resistances 286, 288 may be to two-to-one. The operational amplifier 294 receives the reference voltage at its non-inverting input and the scaled output voltage at its inverting input. The operational amplifier 294 outputs, at its output, a difference between the reference voltage and the output voltage. If the output voltage of the boost converter 102c is in accordance with the reference voltage (i.e., is the same as the reference voltage when scaled by the voltage divider 284), the output of the operational amplifier 294 somewhere between zero and positive supply voltage and the duty cycle is not changed. Conversely, if the output of the scaled output voltage is less than the reference voltage, then a voltage difference is output by the operational amplifier 294. The voltage difference dictates the increase to the duty cycle required for the scaled output voltage to be the same as the reference voltage.

The voltage limiter 296 receives, at its first input, the voltage difference output by the operational amplifier 294. The voltage limiter 296 also receives, at its second input, the maximum voltage difference from the duty-cycle limiter 106d. The voltage limiter 296 outputs, at its output, a voltage that is equal to the output voltage of 294, but always below (limited, clamped) to the output $V_{ERROR\_MAX}$ of the 280. The voltage limiter 296 provides its output to a pulse width modulator (not shown). The voltage limiter 296 limits the voltage $V_{ERROR}$ to the maximum voltage of amplifier 280. Accordingly, the duty cycle is not increased by pulse width modulator the beyond the critical duty cycle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A device comprising:
 a boost converter including a first switch having a first parasitic resistance and a second switch having a second parasitic resistance and an inductance having a third parasitic resistance, the boost converter being configured to output an output voltage;

a pulse width modulator configured to operate the first switch and the second switch in accordance with a duty cycle and adjust the duty cycle based on a received voltage;

a plurality of voltage sensing stages configured to sense a respective plurality of voltages including a first voltage representative of the output voltage, and a second voltage representative of a sum of: a voltage across the first parasitic resistance, a voltage across the second parasitic resistance, and a voltage across the third parasitic resistance;

a duty cycle limiter configured to compare the first voltage and the second voltage and output, based on comparing the first voltage and the second voltage, a first voltage difference that is indicative of a critical duty cycle for operating the boost converter; and a feedback controller configured to:
receive the output voltage, a reference voltage and the first voltage difference;
determine a second voltage difference between the output voltage and the reference voltage;
limit the second voltage difference to the first voltage difference; and
output the second voltage difference to the pulse width modulator to adjust the duty cycle used to operate the boost converter.

2. The device of claim 1, wherein the voltage across the third parasitic resistance is supplied over an entire duration of the duty cycle.

3. The device of claim 1, wherein the duty cycle has a first period during which the pulse width modulator switches the first switch to an electrically conductive state and the second switch to an electrically non-conductive state and a second period during which the pulse width modulator switches the first switch to the electrically non-conductive state and the second switch to the electrically conductive state.

4. The device of claim 3, wherein the voltage across the first parasitic resistance is only supplied over the first period of the duty cycle and is averaged over a duration of the duty cycle.

5. The device of claim 3, wherein, the first voltage is only supplied over the second period of the duty cycle and is averaged over a duration of the duty cycle.

6. The device of claim 3, wherein the voltage across the second parasitic resistance is only supplied over the first period of the duty cycle and is averaged over a duration of the duty cycle.

7. The device of claim 1, wherein the first voltage is the output voltage scaled by a complementary period of the duty cycle.

8. A device comprising:
a boost converter including a first switch having a first parasitic resistance and a second switch having a second parasitic resistance and an inductance having a third parasitic resistance, the boost converter being configured to be operated in accordance with a duty cycle and being configured to output an output voltage; and
a feedback stage configured to sense a plurality of voltages including a voltage representative of the output voltage, and a summation voltage representative of a sum of: a voltage across the first parasitic resistance, a voltage across the second parasitic resistance, and a voltage across the third parasitic resistance, the feedback stage being configured to determine a critical duty cycle for operating the boost converter based at least in part on comparing representative of the output voltage and the summation voltage and limit the duty cycle used to operate the boost converter to the critical duty cycle.

9. The device of claim 8, wherein the duty cycle has a first period during which the first switch is in an electrically conductive state and the second switch is in an electrically non-conductive state and a second period during which the first switch is in the electrically non-conductive state and the second switch is in the electrically conductive state.

10. The device of claim 9, wherein the feedback stage includes a first voltage sensing stage and a second voltage sensing stage.

11. The device of claim 10, wherein the first voltage sensing stage includes:
a first filter coupled in parallel with the inductance and configured to sense a first voltage that is a sum of the voltages across the first and third parasitic resistances and output the first voltage;
a first period voltage scaling stage coupled to the first filter and configured to scale the first voltage by a proportion of the first period to a duration of the duty cycle;
a second filter coupled to the first period voltage scaling stage and configured to sense the scaled first voltage and output the scaled first voltage.

12. The device of claim 11, wherein:
the first filter includes a first resistance and a first capacitance that are serially coupled to each other at a first intermediary node;
the first voltage scaling stage includes a third switch and a fourth switch, the third switch being coupled between the first intermediary node and a second intermediary node, the fourth switch being coupled between the second intermediary node and a ground node, the third switch being configured to be placed in the electrically conductive state during the first period and the electrically non-conductive state during the second period, the fourth switch being configured to be placed in the non-electrically conductive state during the first period and the electrically conductive state during the second period;
the second filter includes a second resistance and a second capacitance that are serially coupled to each other, the second filter being coupled in parallel with the fourth switch, the second filter senses the first voltage across the second capacitance.

13. The device of claim 10, wherein the second voltage sensing stage includes:
a voltage summation stage coupled to the first voltage sensing stage and configured to sense a sum of the voltages across the second and third parasitic resistances;
a voltage subtraction stage coupled to the voltage summation stage and an output terminal of the boost converter and configured to determine a voltage difference between the output voltage and the sum of the voltages across the second and third parasitic resistances;
a second period voltage scaling stage coupled to the voltage subtraction stage and configured to scale the voltage difference by a proportion of the second period of the duty cycle to a duration of the duty cycle;
a filter coupled to second period voltage scaling stage and configured to sense the scaled voltage difference and output a scaled second voltage.

14. The device of claim 10, wherein the feedback stage includes:

a duty cycle limiting stage coupled to the first voltage sensing stage and the second voltage sensing stage and configured to receive a scaled first voltage from the first voltage sensing stage and a scaled second voltage from the second voltage sensing stage, the duty cycle limiting stage being configured to determine a first voltage difference between the scaled first voltage and scaled second voltage and output the first voltage difference.

15. The device of claim 14, wherein the feedback stage includes:
a pulse width modulator configured to operate the boost converter in accordance with the duty cycle; and
a feedback control stage coupled to the boost converter, the duty cycle limiting stage and the pulse width modulator, the feedback control stage being configured to receive a reference voltage and the output voltage of the boost converter, determine a second voltage difference between the reference voltage and the output voltage, determine a minimum voltage of the first voltage difference and second voltage difference and output the minimum to the pulse width modulator.

16. The device of claim 15, wherein the pulse width modulator is configured to adjust the duty cycle of the boost converter in accordance with the minimum voltage such the duty cycle does not exceed a critical duty cycle that maximizes an output power of the boost converter.

17. The device of claim 8, wherein the voltage representative of the output voltage is the output voltage as by a complementary period of the duty cycle.

18. A method comprising:
detecting a first voltage that is a function of an output voltage of a boost converter;
detecting a second voltage representative of a sum of: a voltage across a first parasitic resistance of a first switch of the boost converter, a voltage across a second parasitic resistance of a second switch of the boost converter, and a voltage across a third parasitic resistance of an inductance of the boost converter;
comparing the first voltage and the second voltage to determine a critical duty cycle that maximizes an output power of the boost converter; and
operating the boost converter in accordance with a duty cycle that does not exceed the critical duty cycle.

19. The method of claim 18, further comprising:
determining a difference between the output voltage of the boost converter and a reference voltage for operating the boost converter; and
determining the duty cycle for operating the boost converter so as to minimize the difference between the output voltage and the reference voltage.

20. The method of claim 18, further comprising:
operating the boost converter in accordance with a minimum of the duty cycle and the critical duty cycle.

21. The method of claim 18, wherein first voltage is the output voltage scaled by a complementary period of the duty cycle.

* * * * *